United States Patent [19]

Ozawa

[11] Patent Number: 4,745,497
[45] Date of Patent: May 17, 1988

[54] DIGITAL HEAD POSITION CONTROLLER WITH TRIANGLE WAVE COMPARISON

[75] Inventor: Hiromi Ozawa, Kawasaki, Japan

[73] Assignee: Fuji Electric Company Ltd., Kawasaki, Japan

[21] Appl. No.: 895,032

[22] Filed: Aug. 8, 1986

[30] Foreign Application Priority Data

Aug. 12, 1985 [JP] Japan .................................. 60-177313
Sep. 6, 1985 [JP] Japan .................................. 60-197410

[51] Int. Cl.$^4$ ...................... G11B 21/10; G11B 5/596
[52] U.S. Cl. ........................................................ 360/77
[58] Field of Search .................................. 360/77, 78

[56] References Cited

U.S. PATENT DOCUMENTS 4,157,577 6/1979 Porter, Jr. et al. ................... 360/77
4,530,019 7/1985 Penniman ............................ 360/77

FOREIGN PATENT DOCUMENTS 0145962 6/1985 European Pat. Off. .
50-99709 1/1974 Japan .

Primary Examiner—Raymond F. Cardillo
Assistant Examiner—David L. Robertson
Attorney, Agent, or Firm—Spencer & Frank

[57] ABSTRACT

Head position controlling system for a disc memory unit in which reference information recorded on a recording disc is read out by a head to control tracking of the head. In the case of recording data on the recording disc, a first repetitive pattern signal is recorded on the disc while maintaining a predetermined position relationship with respect to a pair of adjacent data tracks to form an N-th reference track on the disc and then a second repetitive pattern signal is recorded on the disc to form (N−1)-th and (N+1)-th reference tracks adjacent to the N-th reference track. The second repetitive pattern signal is shifted in position so as not to be adjacent to the first repetitive pattern signal. In the case of reading out data recorded on the disc, the head sequentially reads out the first and second repetitive pattern signals from the pair of adjacent reference tracks and then the respective numbers of pattern signals of the first and second repetitive pattern signals exceeding a threshold level of a ramp signal generated in synchronism with the read-out operation is extracted. Subsequently, the position of the head is detected in accordance with the difference between the respective numbers.

4 Claims, 10 Drawing Sheets

DIGITAL HEAD POSITION CONTROLLER WITH TRIANGLE WAVE COMPARISON

BACKGROUND OF THE INVENTION

1. Field of the Invention

The present invention relates to a system for controlling the position of a transducer head in a disc memory unit, typically a so-called fixed disc device and more particularly to a system for controlling the position of a head in a disc memory unit in which, in response to a reference information signal recorded on a recording medium disc, the position of the head is detected and controlled.

2. Description of the Prior Art

A conventional disc memory unit is provided with one or more discs as a medium for recording information and the disc or discs are normally rotated at speeds as high as a few thousand revolutions per minute (r.p.m). On both the main surfaces of the disc tens or hundreds of concentric tracks are formed for recording information. One head is provided for each surface of the disc in order to write and read information into and from the surface of the disc. In the case of writing or reading, the head is brought to a proper position in relation to a specific track selected from a pluarlity of tracks. In principle, the head is positioned so that its center line is coincident with the center line of the specific track.

As the technology of data storage has been advanced, many efforts have been made to reduce the dimensions of a disc and to increase the information storage density to an amount which would be as high as possible.

When data storage density is relatively low, as in the past, an open loop control system can be employed to control the position of the head. In this open loop control system only a pulse instruction, in the form of a predetermined number of pulses is applied to an actuator (such as a stepping motor) so as to properly position the head in relation to a selected track with a specified track designation number, but no detection is made at all for detecting the present position of the head. As a result, fine adjustment of the position of the head is not performed.

It is reported that in the case of a fixed disc of 5.25 inches in diameter, the open loop control system is limited to 500 TPI (track/inch) at the most.

When the data storage density is increased further and exceeds 700 TPI, a closed loop control system must be used to determine the position of the head. In this case, the position of the head must be detected with a high degree of accuracy. To this end, various methods and devices have been proposed and in most cases reference information or so-called servo information for the detection of the position of the head is recorded in advance on a disc. The servo information is read out by the head itself so that the readout reference information is processed to detect the present position of the head.

A closed loop control system based upon the above-described underlying principle is disclosed in detail in, for instance, Japanese Laid-open Patent Application No. 50-99709.

The prior art devised various patterns of reference information recorded on a disc and various methods for processing the readout reference information, but in general a circuit for processing detected reference information is quite complicated. Furthermore, since each pattern of reference information has its own meaning, the reference information must be recorded on a disc with a high degree of accuracy.

When such closed loop control systems including the control system of the type described above were first introduced, they were based upon the technical principle that while desired information is written into and read out from a disc, the position of the head is always controlled. For that purpose, reference information used for detecting the position of the head must be provided in parallel with recording regions in which desired information is stored. As a result, the prior art closed loop control system exhibits a contradiction in that at least one side or surface of a disc must be reserved for recording reference information.

However, it has been known in the art that when a disc rotates at a high speed, such parallel control as described above is not necessarily needed and that when the position of the head is controlled once for each rotation of the disc, the head can be maintained at a predetermined position with a sufficient degree of accuracy. As a result, the area for recording reference information of a disc can be decreased accordingly.

The prior art system will be described in more detail with reference to FIGS. 1-4.

FIG. 1 is a side view of a fixed disc memory unit in which a plurality of discs 1 are fixed as a magnetic recording medium to a spindle 1a which in turn is rotated at a high speed by a spindle motor 1b. Each surface of the disc 1 has a concentric area which defines a plurality of tracks 2 as shown in FIG. 2 and each track 2 has a sector area which is inserted into the track 2 and into which reference information 3 is stored.

Heads 4 are arranged to be opposite to the respective surfaces of the discs 1 to write and read information into and from the respective surfaces of the discs 1. The heads 4 are mounted to head arms 4a and then carried by a carrier 5 which is movable in the directions indicated by an arrow P. The carrier 5 is guided by guides 5a and is driven to be maintained at a controlled position by means of an actuator 6 through a thin metal band 5b.

FIG. 3 shows a pattern of the prior art reference information 3. Reference information 3a and 3b for the center track 2b of the three tracks 2a, 2b and 2c is shown. Each reference information 3a or 3b consists of alternately arranged S and N poles from the left to the right in FIG. 3. The recording patterns 3a and 3b are so defined that when the disc 1 is displaced in the direction indicated by an arrow Q, the N poles change to the S poles simultaneously at the midpoint m between the leading edge l and the trailing edge n, but on both sides of the midpoint m, the change from the N pole to the S pole does not occur simultaneously. A plurality of patterns each consisting of S and N poles as shown in FIG. 3 are repeated in the actual recording patterns 3a and 3b.

FIG. 4 illustrates waveforms of the signals derived from the head 4 when the head 4 reads out the reference information 3a and 3b. For the sake of easy understanding, it is assumed that the head 4 is moved upwardly from the normal position P0 for the track 2b and is located at the position P1 which is spaced apart from the position P0 by a distance equal to one half of the pitch between two adjacent tracks. Then, the position of the head 4 is in line with the position of reference information 3a so that, as shown in the case of the head position P1 of FIG. 4, the readout signal has not only a peak Va correspondong to the reference information 3a but also a peak Vm corresponding to the midpoint m between the ends of the reference information 3a. These peaks Va and Vm have opposite polarities as shown.

On the other hand, when the head 4 is moved downward from the normal position P0 and is located at the position P2 which is spaced apart from the normal position P0 by a distance equal to one half of the pitch between two adjacent tracks, the readout signal has a peak Vb corresonding to the reference information 3b and a peak Vm corresponding to the midpoint between the ends of the reference information 3b.

Therefore, it is apparent that when the head 4 is at the normal position P0, not only the peaks V and Vb corresponding to the reference information 3a and 3b but also the peak Vm corresponding to the midpoint between the ends of the reference information 3a and 3b appear at the same time. In this case, values of the peaks Va and Vb are equal to each other and, as is readily imagined, are substantially equal to one half of a value of the sole peak Va or Vb which appear when the head 4 is displaced by one half pitch upward or downward as described above.

However, the value of the center peak Vm having the opposite polarity remains unchanged regardless of the position of the head 4. Furthermore, the time that the peak Va appears and the time that the peak Vb appears are always separated from each other by Wt corresponding to the difference in the S- and N-pole patterns between the reference information 3a and 3b.

The two peaks Va and Vb are obtained from the waveform of the readout signal independently of each other with the center peak Vm being used as a reference. Furthermore, the deviation of the head 4 from its normal position P0 can be detected from the difference between the values of the two peaks Va and Vb. That is, when the value of the peak Va is higher than that of the peak Vb, the head 4 is deviated upwardly from its normal position P0 toward the position P1. On the other hand, when the value of the peak Va is lower than that of the peak Vb, the head is deviated downwardly from its normal position P0 to the position P2.

When detecting the position of the head or a deviation of the head from its normal position by the prior art system of the type described above, it is necessary to detect the values of the peaks which appear in the signal obtained when the reference information is read out or an analog signal representative of the difference between the values of the two peaks with a very high degree of accuracy. The value of each peak must be temporarily stored as an analog signal before the value is detected by a peak hold ciruit. This means that, in order to minimize an error which results from the above-described process, a high-accuracy circuit is required.

As described above, according to the prior art system, a circuit for separating the peaks which appear in the output signal derived when the reference information is read out, a circuit for holding the value of each of the peaks thus separated from each other and a circuit for comparing the values of the separated peaks must be upgraded or become quite complicated. In addition, in order to detect the position of the head with a high degree of accuracy, the reference information must be recorded with a high degree of accuracy, so that means for recording the reference information on a disc also becomes complicated and expensive. Furthermore, a relatively large area which is sufficient to record such reference information must be secured on the surface of a disc.

SUMMARY OF THE INVENTION

In view of the above, one of the objects of the present invention is to provide a method for cntrolling the position of a head of a disc memory unit in which a circuit for processing a reference information signal read out through the head can be made by a simple arrangement and which can determine the position of the head with a high degree of accuracy.

Another object of the present invention is to provide a method for controlling the position of a head of a disc memory unit in which the writing of the reference information on a disc is facilitated and the area of a region of the disc required for the recording of such reference information is reduced to as small an amount as possible.

A further object of the present invention is to provide a system for controlling the position of a head of a disc memory unit in which the accuracy in the detection of the position of the head is not adversely affected by the deviation of an index pulse, even if the timing by which the index pulse is generated is deviated from the timing by which reference information is written in a disc.

The first aspect of the present invention, a method for controlling the position of the head in a disc memory unit in which reference information recorded on a recording medium is read out by the head to control tracking of the head comprises the steps of:

(a) in the case of recording data on the recording medium;

(a-1) recording a first repetitive pattern signal on the recording medium while maintaining a predetermined position relationship with respect to a pair of adjacent data tracks to form an N-th reference track (where $N=1, 2, \ldots$) on the recording medium; and (a-2) recording a second repetitive pattern signal on the recording medium to form $(N-1)$-th and $(N+1)$-th reference tracks adjacent to the N-th reference track, the second repetitive pattern signal being shifted in position so as not to be adjacent to the first repetitive pattern signal; and (b) in the case of reading out data recorded on the recording medium;

(b-1) sequentially reading out by the head the first and second repetitive pattern signals from the pair of adjacent reference tracks;

(b-2) extracting the respective numbers of pattern signals of the first and second repetitive pattern signals which exceed a threshold level of a threshold signal which is a ramp signal generated in synchronism with the read-out operation; and (b-2) detecting the position of the head in accordance with the difference between the respective numbers of the extracted pattern signals exceeding the threshold level.

Here, an up/down counter can be used to compute the difference between the respective numbers of the extracted pattern signals exceeding the threshold level.

The reference track may comprise a plurality of region pairs arranged in cascade, and a each region pair may have a first region into which a group of repetitive pattern signals is recorded and a second region which is the same in size as the first region and which has no signal.

The ramp signal can be a signal which rises linearly when the head moves from a leading edge to a midpoint of the reference track and which falls linearly when the head moves from the midpoint to a trailing edge of the reference track.

The ramp signal can be a signal which rises linearly when the head moves from a leading edge to a midpoint of the reference track, is reset when the head reaches the midpoint of the reference track and rises again linearly with the same gradient as the linear rising of the signal when the head moves from the midpoint to a trailing edge of the reference track.

The second aspect of the present invention, a system for controlling the position of the head in which reference information recorded on a recording medium is read out by the head to control tracking of the head, comprises:

(a) readout means for reading out two kinds of repetitive pattern signals as reference signals from a pair of adjacent reference regions on the recording medium by the head, the repetitive pattern signals being obtained from repetitive patterns which are relatively shifted from each other in position so that the repetitive patterns are not adjacent to each other between the adjacent reference region;

(b) threshold signal generating means for generating as a threshold signal a ramp signal having a width which is shorter than the time interval between a leading edge and a trailing edge of the reference information signal;

(c) synchronizing means for generating a synchronizing signal at a time point delayed from the leading edge of the reference information signal to start the threshold signal generating means to generate the threshold signal;

(d) comparator means for comparing the two kinds of repetitive pattern signals contained in the reference information signal with the threshold signal to output two kinds of pulse trains each corresponding to the number of repetitive pattern signals which exceed the threshold signal time-sequentially; and (e) counter means receiving the two kinds of pulse trains for counting the difference between the number of pulses contained in one of the two kinds of pulse trains and the number of pulses contained in the other pulse train to detect the position of the head in accordance with the difference.

The third aspect of the present invention, a system for controlling the position of the head in which reference information recorded on a recording medium is read out by the head to control tracking of the head, comprises:

(a) readout means for reading out two kinds of repetitive pattern signals as reference signals from a pair of adjacent reference regions on the recording medium by the head, the repetitive pattern signals being obtained from repetitive patterns which are relatively shifted from each other in position so that the repetitive patterns are not adjacent to each other between the adjacent reference region;

(b) threshold signal generating means for generating as a threshold signal a ramp signal having a width which is equal to a time interval between a leading edge and a trailing edge of the reference information signal;

(c) synchronizing means for generating a synchronizing signal in synchronism with the leading edge of the reference information signal to start the threshold signal generating means to generate the threshold signal;

(d) comparator means for comparng the two kinds of repetitive pattern signals contained in the reference information signal with the threshold signal to output two kinds of pulse trains each corresponding to the number of the repetitive pattern signals which exceed the threshold signal time-sequentially; and (e) counter means receiving the two kinds of pulse trains for counting the difference between the number of pulses contained in one of the two kinds of pulse trains and the number of pulses contained in the other pulse train to detect the position of the head in accordance with the difference.

Each block reference information used in the present invention may have a very simple pattern in which S and N poles or "ON" and "OFF" state repeatedly alternate. As a result, a repetition frequency of the pattern can be shortened so that reference information having a pattern repetition number on the order of 100 can be stored in a narrow region and consequently the position of the head can be detected with a high degree of accuracy.

The reference information recorded in two adjacent regions are staggered from each other in the longitudinal direction of the track, so that the reference information read out through the head from the adjacent regions can be distinctly separated from each other in time. As a result, the mutual separation between the reference information can be made in an extremely simple manner yet with a high degree of accuracy.

A ramp signal generated in synchronism with the read out of the reference information and the reference signal read out are compared by, for instance, a comparator, so that the ramp signal is digitized. As a consequence, the position of the head is detected without error and the arrangement of circuitry can be considerably simplified.

In order to count the repetitive pattern signals, there may be provided two counters for counting the respective signals read out from both the regions, respectively, but as described above, since both of the signals are read out at different times, one up/down counter is sufficiently used instead of the two counters and an arithmetic circuit for obtaining a difference between the counts in such a way that after one signal has been counted up by the up/down counter, the other signal is counted down.

In one mode advantageous for generating the ramp signal, one triangular waveform signal can be generated in response to the signals read out from the two reference information regions. Alternatively, signals having the same sawtooth waveform can be generated in response to the signals read out from the respective regions. It is not needed that a time gradient of the leading or trailing portion of such a waveform is strictly linear and it is sufficient that the signals read out from both the regions have the same waveforms or symmetrical waveforms.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
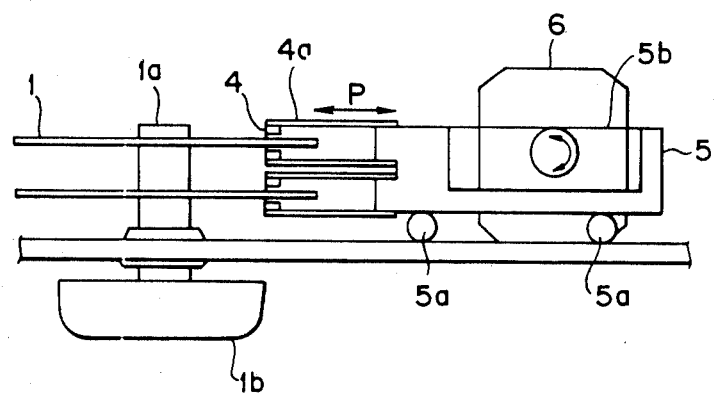
FIG. 1 is a side view showing a major portion of an example of a prior art disc memory unit.
Figure 2:
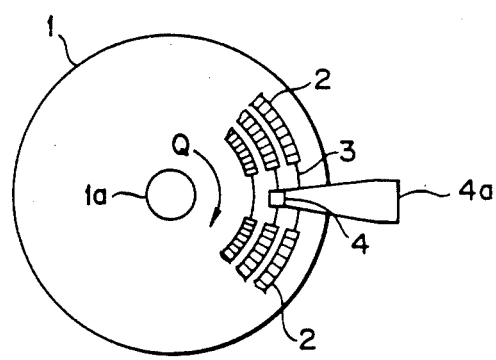
FIG. 2 is a top view thereof showing only a minor portion thereof.
Figure 3:
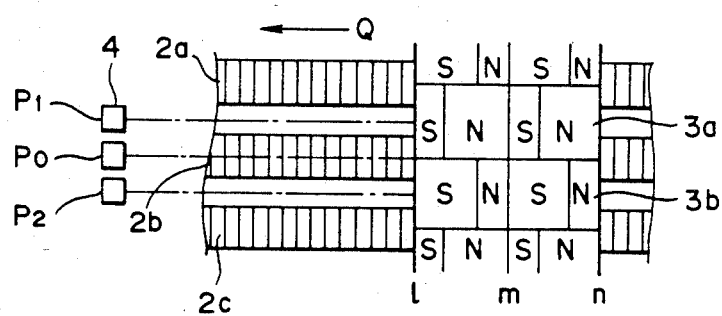
FIG. 3 is a diagram used to explain the writing of reference information in accordance with the prior art.
Figure 4:
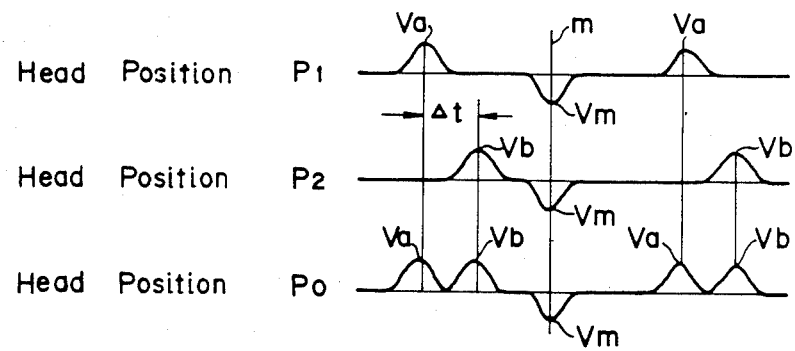
FIG. 4 illustrates waveforms of the output signals obtained when the prior art reference information as shown in FIG. 3 is read out.
Figure 5:
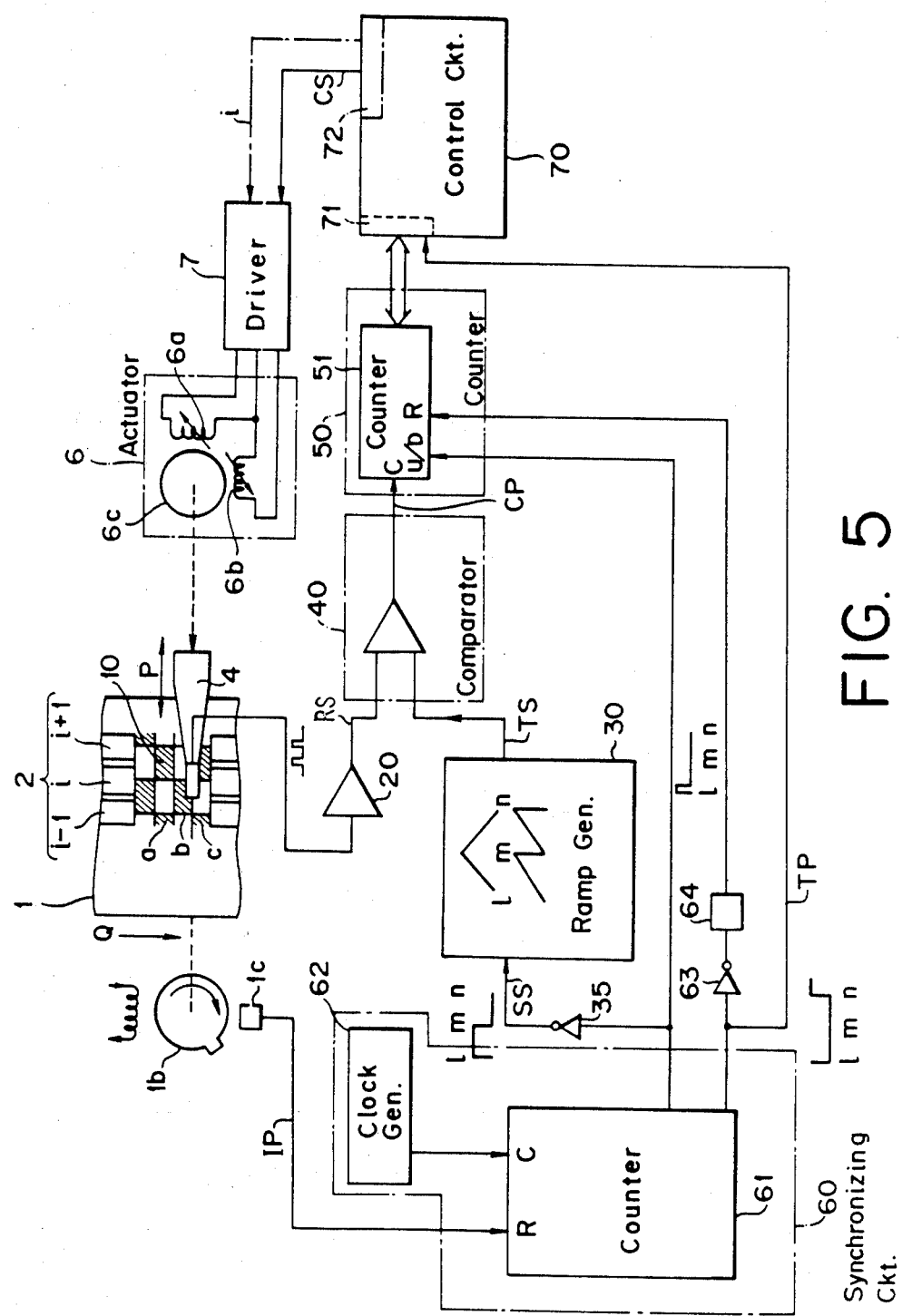
FIG. 5 is a block diagram showing one embodiment of a whole head-position control device in accordance with the present invention used in a disc memory unit.

FIG. 5 shows a block diagram of an embodiment of a head-position control device to which the present invention is applied. Here, the same reference numerals are used to designate portions similar to those in FIGS. 1–4.

In the upper portion of FIG. 5, a portion of the disc 1 as a recording medium is shown in a developed form. The portion has three tracks i−1, i and i+1. Reference information 10 is so written into the disc 1 as to interrupt a portion of the tracks. A reference signal RS is read out from the portions having reference infromation by the head 4 and an amplifier 20 to detect the position of the head 4.

As in the case of the prior art control system described above, the disc 1 is rotated at a high speed by a spindle motor 1b such as an electronic motor and the head 4 is driven or maintained at a desired position by the actuator 6. The actuator 6 can be a multipolar stepping motor having two-phase stator coils 6a and 6b and a rotor 6c, the rotor 6c being rotated with an accuracy of less than one degree per pulse. Furthermore, when a current flowing through one or both of the coils 6a and 6b is relatively increased or decreased, the motor 6 functions as a torque motor so that the angular position of its rotor 6c can be finely adjusted.

A driver 7 generates pulses for driving the motor 6 and adjusts the two-phase current. That is, in response to a numerical instruction represented by "i" shown in the right portion of FIG. 5, the driver 7 shifts the head 4 to the i-th track 2.

Figure 6:
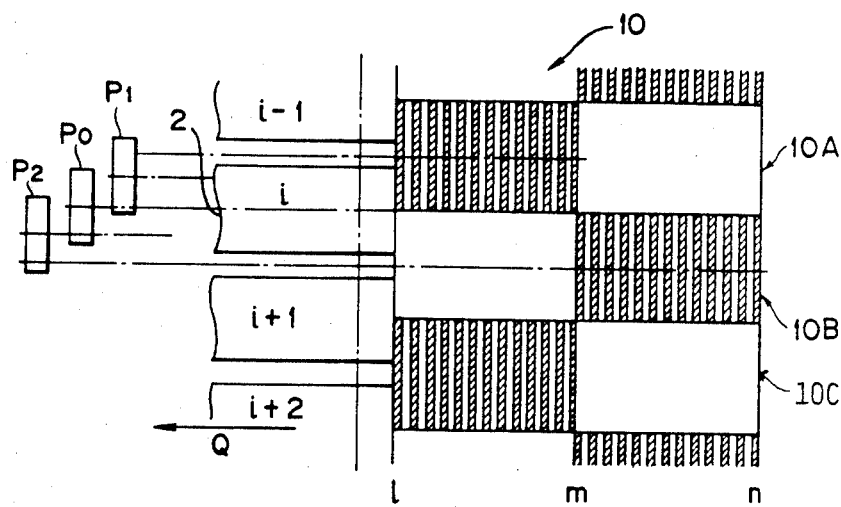
FIG. 6 is a diagram used to explain an example of writing of reference information on the surface of a disc according to the present invention.

FIG. 6 shows in detail an example of a recording format of the reference information 10. The recorded regions 10A–10C each having reference information are displaced in the radial direction by a distance equal to one half of the pitch between the two adjacent tracks 2 in relation to the tracks 2. That is, first reference information 10A is recorded between the (i−1)-th and i-th tracks 2 and second reference information 10B is recorded between i-th and (i+1)-th tracks 2. The reference information regions 10A–10C each represented by a stripe pattern are staggered from each other with respect to the center line m in the longitudinal direction of the tracks 2 so that the reference information regions are not positioned adjacent to each other. Each reference information region has a pattern consisting of about one hundred N and S poles or "ON" and "OFF" states. Even if the signal pattern between the leading edge 1 and the trailing edge n is repeated several times in order to ensure the accuracy in the detection of the position of the head 4, the reference information occupies only 1–2% of the whole circumference of the disc 1.

Three positions P0, P1 and P2 of the head 4 are illustrated in the left portion of FIG. 6. The position P0 is the normal position for the i-th track 2 and the position P1 is displaced upwardly from the normal position P0 and is spaced apart therefrom by a distance shorter than one half of the pitch between the two tracks, while the position P2 is displaced downwardly from the normal position P0 and is spaced apart therefrom by a distance shorter than one half of the pitch between the two tracks.

Figure 7:
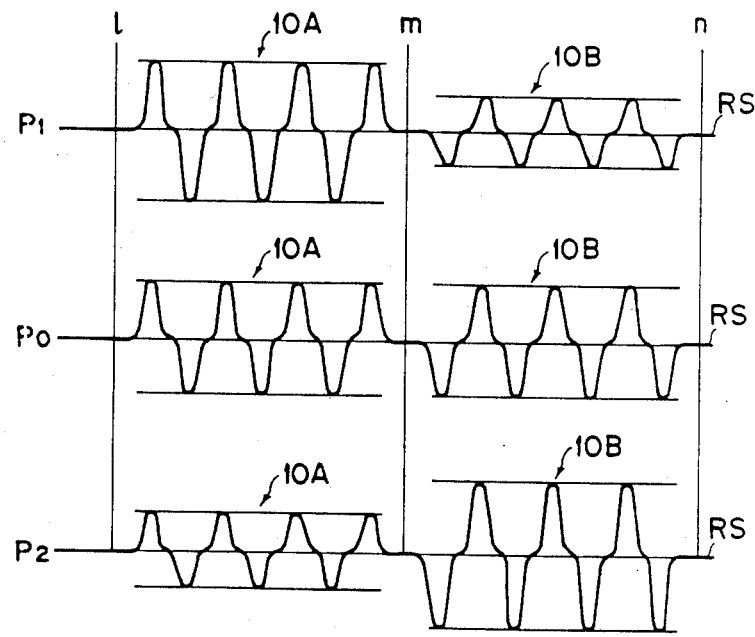
FIG. 7 illustrates the waveforms of the output signals obtained when the reference signal is read out by the head at different positions.

FIG. 7 illustrates waveforms of the reference signals RS read out from the head 4 when the head 4 is located at the positions P0–P2. It is apparent from FIG. 7 that when the head 4 is at the normal position P0, the peak values of the reference signals RS corresponding to the reference information 10A and 10B are equal to each other. When the head 4 is at the upwardly displaced position P1, the peak values of the reference signal corresponding to the reference information 10A are higher than those of the reference signal corresponding to the reference information 10B. When the head 4 is at the downwardly displaced position P2, the peak values of the reference signal correspondong to the reference information 10A are lower than those of the reference signal corresponding to the reference information 10B.

Referring back to FIG. 5, a ramp signal generator 30 generates a ramp-shaped threshold signal TS for the reference signal RS. As shown in the block of the ramp signal generator 30, the generator 30 generates a triangular waveform which has a peak corresponding to the center m (See FIG. 6) of the reference signal 10. Alternatively, the generator 30 generates a sawtooth waveform which is repeated periodically on both sides of the midpoint m. A synchronizing circuit 60 generates a synchronizing signal SS in response to which the ramp-shaped threshold signal TS is synchronized with the reference signal RS. In the first embodiment, a so-called index pulse IP is used to generate the synchronizing signal SS.

As is well known in the art, the index pulse IP is a sync pulse in response to which data is written into or read out from the disc 1. For instance, one index pulse IP is generated at every one rotation of the disc 1 by an angular position pulse generator 1c mounted to the spindle motor 1b.

The synchronizing circuit 60 has, for instance, a counter 61 which is reset in response to the index pulse IP to count clock pulses from a clock generator 62. Therefore, when the synchronizing signal SS is derived from the last stage of the counter 61 through an inverter 35, a signal which is set in the "1" state at the leading edge l of the reference information and falls to the "0" state at the midpoint m of the reference information in response to the index pulse IP is generated.

Figure 8:
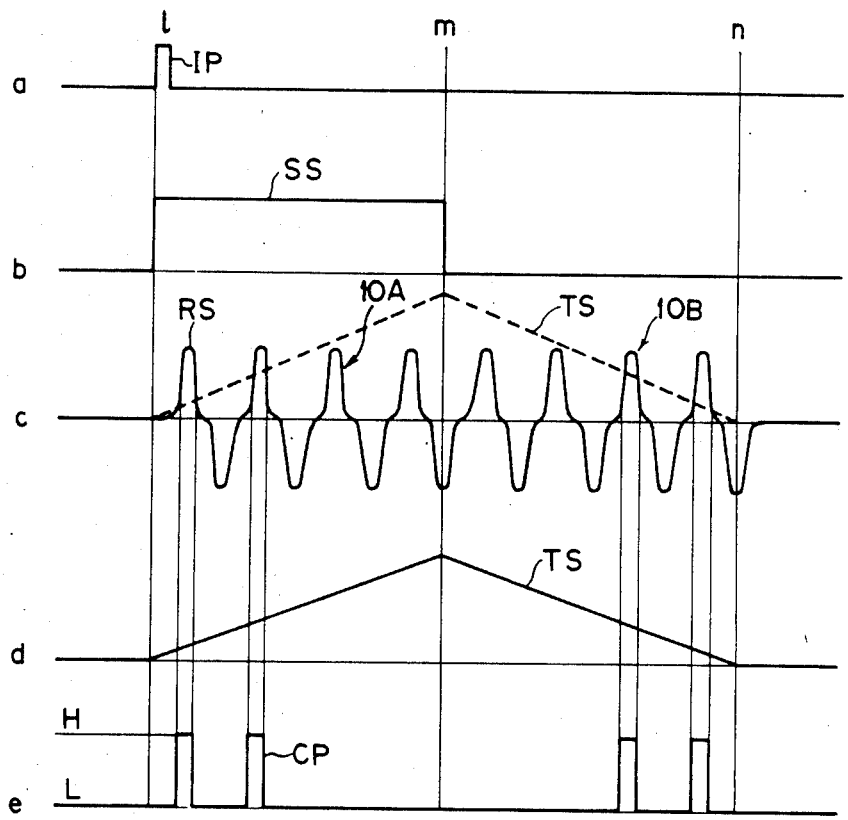
FIGS. 8a–e and 9a and b illustrate waveforms used to explain the process of generating count pulses by comparing the reference information signal with the ramp signal.

The index pulse IP and the synchronizing signal SS have waveforms as shown at a and b, respectively, in FIG. 8. It is not necessary to use the index pulse IP in order to obtain the synchronizing signal SS in synchronism with the reference signal RS in the synchronizing circuit 60 and alternatively a specific reference information can be written into the reference information 10.

The ramp signal TS thus generated is used as a threshold value and the reference signal RS is evaluated or compared with the ramp signal TS by a comparator 40. This process is indicated by the waveforms c, d and e in FIG. 8. The reference signal RS whose waveform is shown at c in FIG. 8 is obtained when the head 4 is at its normal position P0 (See FIG. 6), and the peak values of the reference signal RS with respect to the reference information 10A are equal to those of the reference signal RS with respect to the reference information 10B. The reference signal RS is compared with the ramp signal TS whose waveform is shown at d in FIG. 8. As a result, the comparator 40 generates the pulses CP as shown at e in FIG. 8. The number of pulses CP is equal to the number of times that the peaks of the reference signal RS exceed the ramp signal TS. That is, since the peak values of the reference signals RS obtained from the two reference information 10A and 10B are equal to each other, two pulses CP are obtained from each of the reference information 10A and 10B.

Figure 9:
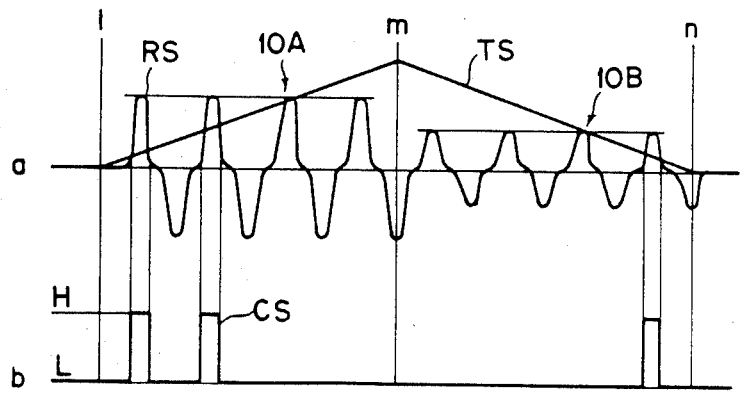

FIG. 9 illustrates a waveform obtained when the head 4 is at the position P1 (See FIG. 6). The peak values of the two reference signals RS from the reference information 10A and 10B are different from each other, so that one pulse CP is obtained from the reference information 10B while two pulses CP are obtained from the reference information 10A.

Referring back again to FIG. 5, a counter 50 is a circuit which counts the pulses CP from the adjacent reference information 10A and 10B to obtain a difference between the pulses CP from the reference information 10A and the pulses CP from the reference information 10B. In the first embodiment, the counter 50 consists of one up/down counter 51 and is reset in synchronism with the index pulse IP. In order to reset the counter 51, a trigger pulse TP is derived from the output stage (which is next to a counting stage from which the synchronizing pulse SS is derived) of the counter 61 in the synchronizing circuit 60. The trigger pulse TP is converted into a reset pulse in synchronism with the index pulse IP through an inverter 63 and a one-shot circuit 64. The reset pulse thus obtained is applied to the reset terminal of the up/down counter 51.

A complement pulse which has a level opposite to that of the synchronizing pulse SS is applied to an up/down operation designation input terminal U/D of the counter 51 and the counting mode is switched at a time point corresponding to the midpoint m of the reference information 10. Therefore, in synchronism with the index pulse IP, the up/down counter 51 starts counting up the count pulses CP at a time point corresponding to the leading edge l of the reference information 10 and then is switched to count down the count pulses CP at a time point corresponding to the midpoint m of the reference information 10. As a consequence, at a time point corresponding to the trailing edge n of the reference information 10, the difference between the number of count pulses CP obtained from the reference information 10A and the number of count pulses CP obtained from the reference information 10B adjacent to the reference information 10A is stored as a count value in the counter 51.

The output from the counter 51 is applied in synchronism with the rise of the next trigger pulse TP to a buffer 71 in a control circuit 70. The control circuit 70 may comprise, for instance, one microcomputer. In response to the output from the counter 50 representing a deviation of the head 4 from its normal position P0, the control circuit 70 applies a head-position-correction command CS to the driver 7 through an output port 72.

In response to the correction command CS, the driver 7 controls, for example, the currents distributed to the stator coils 6a and 6b of the actuator 6, so that the head 4 is finely adjusted to be brought to its normal position P0. When the actuator 6 is a stepping motor as is the case of the first embodiment, the actuator 6 is used as a torque motor so as to perform the above-described fine adjustment.

Each reference information has about 100 repetitive patterns, each consisting of two alternately arranged different states, so that when the head 4 is substantially deviated from its normal position P0, a count value corresponding to a difference of about tens of pulses is detected as a deviation and is applied from the counter 50 to the control circuit 70. Even when a deviation of the head 4 from its normal position P0 is small, a count value corresponding to a difference of a few pulses is obtained as a deviation. In the latter case where the deviation is small, only one correction or fine adjustment of the position of the head 4 is sufficient in general. Even when the deviation is relatively large, it is sufficient that the fine adjustment is made twice.

Figure 10:
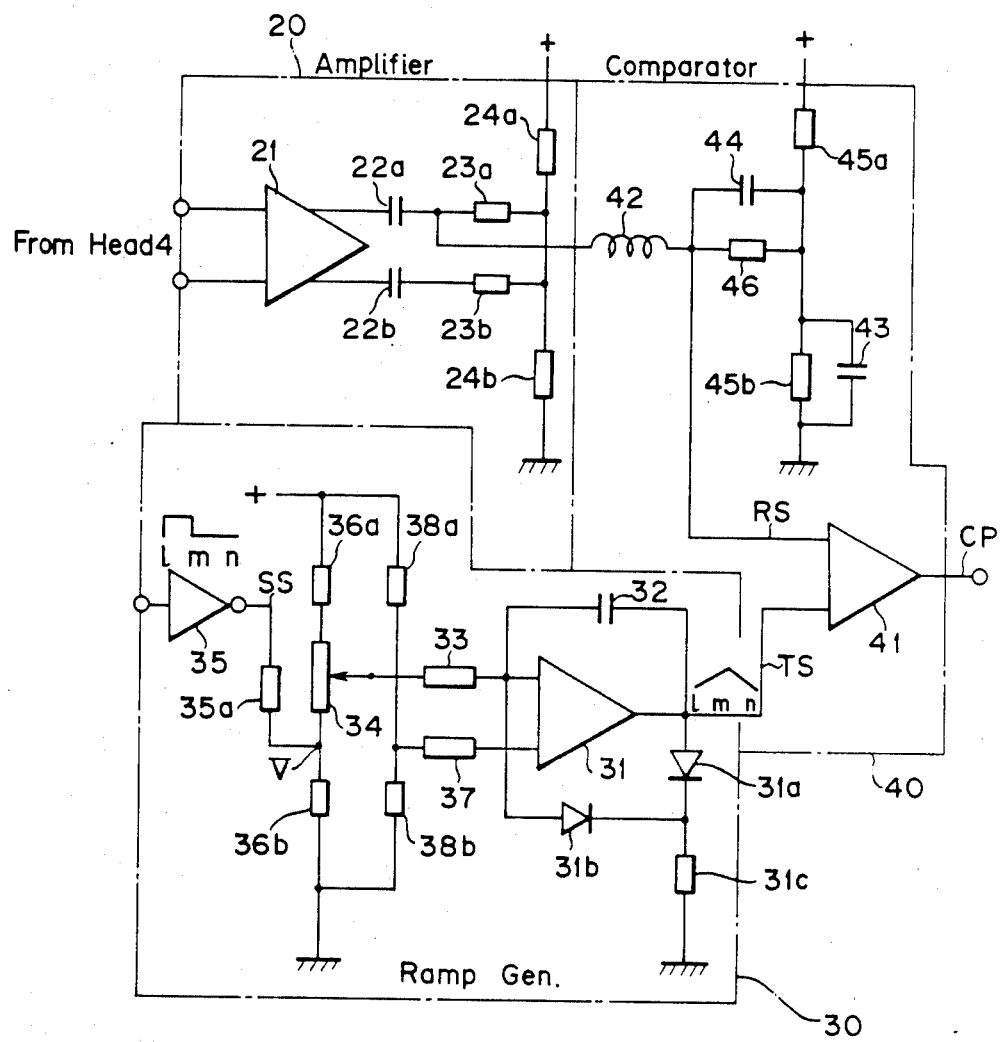
FIG. 10 is a circuit diagram showing one embodiment of a circuit of a major portion incorporated in the embodiment of the present invention.

Next, a specific embodiment of major circuits of the head-position control device shown in FIG. 5 will be further described in detail with reference to FIG. 10. In FIG. 10, the amplifier 20 for amplifying the reference signal RS includes a high precision operational amplifier 21 having differential inputs and differential outputs and an external circuit on the output side thereof. Capacitors 22a and 22b which receive two differential outputs, respectively, cut off a DC component in the output signal, so that only an AC component is applied to a resistor circuit in the next stage. A pair of resistors 24a and 24b are load resistors for the two differential outputs, respectively. An amplified output is substantially derived from the junction between the resistors 24a and 24b. Here, in order to maintain the symmetry of the differential amplification of the operational amplifier 21, a pair of resistors 23a and 23b are inserted between the capacitors 22a and 22b and the junction, respectively.

The ramp generator 30 has an operational amplifier 31 and a feedback capacitor 32 is interconnected between the input and output of the operational amplifier 31 so as to perform an integration operation as is well known in the art. The signal to be integrated is the potential at a common junction V on the left side of the ramp generator 30 and the synchronizing signal SS from the inverter 35 is applied through a resistor 35a to the junction V. Therefore, during the movement of the head 4 from the leading edge l to the midpoint m of the reference information, the potential at the junction V is maintained in the logical "1" state, while during the movement of the head 4 from the midpoint m to the trailing edge n, the potential is maintained in the logical "0" state. The integration speed; that is, the gradient of the ramp signal TS is dependent upon a RC time constant which is determined by the capacitance of the capacitor 32 and the resistances of a resistor 33 and a variable resistor 34 which are connected in series to the capacitor 32.

In response to the variation in potential at the junction V, the integrator integrates the logical level "1" in the positive direction at a predetermined integration speed and then in the negative direction at the same integration speed. As a result, the waveform of the output or the ramp signal TS is an isosceles triangle.

The potential at the upper side input terminal of the operational amplifier 31 is determined by a pair of resistors 36a and 36b, while the potential at the lower side input terminal thereof is determined by a pair of resistors 38a and 38b. The potentials are applied to the upper and lower input terminals via resistors 33 and 37, respectively. Two diodes 31a and 31b and a resistor 31c associated with the operational amplifier 31 constitute a limiter which ensures the above-described operation of the operational amplifier 31.

The comparator 40 receives the ramp signal TS as a variable threshold value signal to compare the AC component of the reference signal RS with the variable threshold value. A low pass filter is provided in order to remove an excessive high frequency component included in the reference signal RS. The low pass filter can be an inverted L type LC filter having a reactor 42, a capacitor 43 and a capacitor 44. A pair of resistors 45a and 45b are provided so as to determine the potential applied to one of the two input terminals of the comparator amplifier 41 which receives the reference signal RS, so that a DC potential determined by the resistors 45a and 45b is applied through a resistor 46 to this one input terminal. The comparator amplifier 41 compares the reference signal RS with the ramp signal TS to produce the above-described count pulses CP.

As described above, the ramp signal TS may consist of two cycles of a sawtooth waveform. In this case, the ramp generator 30 can be a simple arrangement, and the simplest ramp generator can be arranged by a CR charging-discharging circuit which is reset or discharged at time points corresponding to the leading edge l and the midoint m of the reference signal. In the latter case, the linearity of the gradient of the ramp signal TS is not guaranteed, but there arises no problem at all as long as the repeated waveforms are the same.

In addition to the first embodiment described above, the system for controlling the position of the head in a disc memory unit in accordance with the present invention can be carried out in various ways. For instance, it is not necessary to insert the region for storing reference information 10 into the tracks 2 and alternatively the reference information 10 may be recorded on a specific disc surface. That is, when the entire specific surface of a disc is used to record the reference information 10, the present invention can be applied to a system in which a fine adjustment of the position of the head can be continued simultaneously with writing information into the tracks or reading information from the tracks.

When the control circuit 70 consists of a microcomputer, it can also accomplish the function of the counter 50.

The constructions and modes of operation of the actuator 6, the synchronizing circuit 60 and the control circuit 70 are not limited to those described above with reference to the first embodiment of the present invention and it is to be understood that various modifications and partial elimination thereof can be effected within the scope of the present invention.

When the number of repetitive patterns included in the reference information is suitably selected, the position of a transducer head can be detected with a desired degree of accuracy. Furthermore, the repetitive patterns may be very simple, and hence even when the number of the repetitive patterns is considerably increased in order to ensure the detection of the position of the head with a high degree of accuracy, there is no fear at all that the region for storing therein the reference information signal is increased excessively. Thus, the present invention can be advantageously applied to a so-called data surface servo type disc memory unit.

It is preferable in the first embodiment described above that the ramp generator for generating a ramp-shaped signal as a threshold value which varies in time and the amplifier for reading out the reference information be high precision electronic circuits, but after the comparison of reference information with the ramp signal, the signal to be evaluated is in a digital form, so that there is no fear at all that an error occurs and accordingly the evaluation circuit can be made quite simple as compared with the prior art evaluation circuit. In most cases, the functions succeeding the pulse counting function can be performed by a conventional computer circuit so that it is not necessary to specially provide an evaluation circuit in practice.

According to the present invention, the separation between the signals derived from the adjacent reference information can be made in a simple manner yet with a high degree of accuracy, so that it is not necessary to provide a circuit specially arranged for the separation of the signals.

As described above, means for reading out the reference information with a high degree of accuracy can be arranged in a very simple manner. Therefore, means for recording or writing the reference information can be made simple in arrangement. As a result, when the repetitive pattern in the reference information is simplified, the region of a disc surface upon which the reference information is stored can be reduced in area and consequently the recording capacity of the disc memory unit can be increased.

Next, a second embodiment of the present invention which is substantially similar to the first embodiment described above but is partially modified in order to ensure a more stable operation, will be described.

Figure 11:
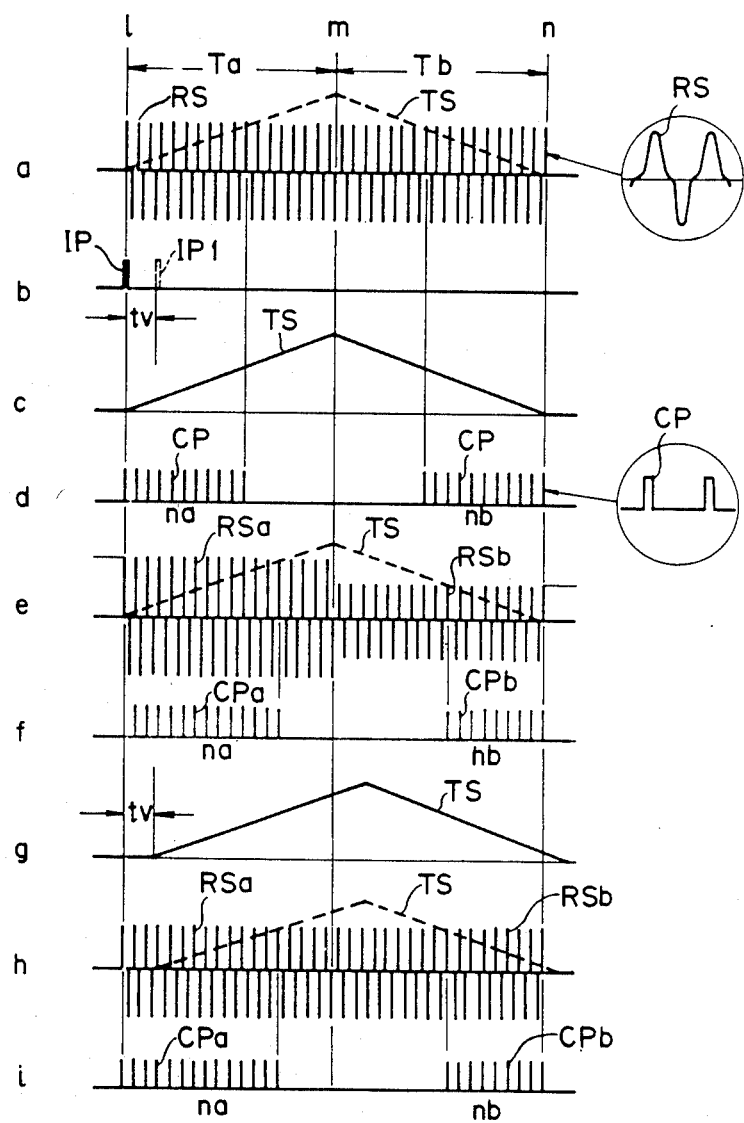
FIG. 11, consisting of a–j, illustrates waveforms used to explain the operations of the embodiment of the present invention from a different standpoint.

FIG. 11 illustrates waveforms used to explain the underlying principle of the first embodiment described above with reference to FIGS. 5-10 from a differential technical standpoint.

As described above, each of the reference information 10A and 10B read out through the head 4 is a simple repetitive signal in which, as shown on an enlarged scale on the right side of a waveform a in FIG. 11, the positive and negative pulse signals alternate and the signals RS which represent the reference information 10A and 10B occur in the different time intervals Ta and Tb. It should be noted here that the waveform a shown in FIG. 11 is obtained only when the head 4 is at its normal position P0 with respect to the i-th track 2 so that the height of the repetitive pulses in the readout signals representative of the reference information 10A and 10B are the same during the time intervals Ta and Tb.

A waveform b in FIG. 11 illustrates the so-called index pulse IP. In synchronism with the index pulse IP, the reference information 10 is written or recorded from its leading edge l.

A waveform c shown in FIG. 11 is a threshold signal TS in the form of a triangular waveform signal which is generated in synchronism with the index pulse IP and whose instantenous value represents a threshold value which varies in time and is compared with the peak value of each pulse in the readout signal RS. As a result of the comparison, only the pulses in the readout signal RS whose peak values are in excess of the threshold value are outputted as count pulses CP as shown by a waveform d in FIG. 11. It is apparent that the numbers na and nb of the count pulses CP derived from the reference information 10A and 10B are the same.

However, when the head 4 is at the position P1 which is deviated upwardly from the normal position P0 shown in FIG. 6, the peak values of the pulses in the signal RSa read out from the reference information 10A are higher than those of the pulses in the signal RSb read out from the reference information 10B as shown by a waveform e in FIG. 11. When these pulses are compared with the threshold signal TS, the number na of the count pulses CPa corresponding to the reference information 10A is different from the number nb of the count pulses CPb corresponding to the reference information 10B. That is, when the head 4 is at the upwardly deviated position P1, na becomes larger than nb. In like manner, when the head 4 is at the downwardly deviated position P2, na becomes smaller than nb.

Therefore, in response to a difference (na−nb) between the numbers na and nb of the count pulses CPa and CPb corresponding to the reference information 10A and 10B, the amount and direction of deviation of the head 4 from its normal position P0 can be detected.

In the above-described system for detecting the position of the head, the peak values of the pulses in the readout signal RS are treated in an analog fashion, but the count pulses CP obtained from the comparison of the pulses in the readout signal RS with the threshold value are processed by a digital circuit, so that, as compared with the prior art system described above with reference to FIGS. 1-4, the circuit arrangement can be made simple and is highly reliable in operation. Furthermore, the count pulses CPa and CPb corresponding to the reference signals 10A and 10B are derived during time intervals which are distinctly separated in time, so that the signal separation circuit can be eliminated. Moreover, each of the reference signals 10A and 10B may be a simple repetitive pattern, so that there is an advantage in that the reference signals 10A and 10B can be written or stored in a simple manner with a high degree of accuracy.

In principle, the present invention has advantages over the prior art, but in practice, there is the possibility that it has an unexpected problem which is caused by the fact that the threshold signal TS is generated in synchronism with the index pulse IP.

As described above, the reference information signal 10 is written in synchronism with the reference signal RS, so that it is sufficient in principle to generate the threshold signal TS in synchronism with the index pulse IP, i.e., a base signal for determining the timing for reading out the reference information. However, there is the possibility that the index pulse IP itself is in practice not synchronized with the leading edge l of the refernce signal 10. That is, while the reference information 10 is recorded on the surface of the disc 1, the conventional index pulse IP is generated by the spindle motor 1b for rotating the disc 1. Therefore, due to variations in environmental temperature and change with age, the index pulse IP1 is generated, as shown by the waveform b in FIG. 11, at a timing different from the timing of the reference signal RS when the reference information 10 is written. A time deviation tv of the index pulse IP1 is small, but it affects the count pulses CPa and CPb so that their numbers na and nb are varied by a few pulses and consequently the accuracy in the detection of the position of the head is adversely affected.

FIG. 11 illustrates a waveform a of the threshold signal TS generated in synchronism with the index pulse IP1 which is delayed by the time tv relative to the normal timing.

FIG. 11 illustrates a waveform h of the readout signals RSa and RSb when the head 4 is at its normal position P0, which are compared with the threshold signal TS which is delayed in time. The waveforms of the count pulses CPa and CPb obtained from the comparison are shown by a waveform i in FIG. 11. In principle, the numbers na and nb of the count pulses CPa and CPb must be equal to each other, but in practice Na>Nb.

This problem is caused by the fact that the index pulses IP are generated at a place different from the disc 1, so that the problem can be overcome when additional reference information for generating the index pulses IP is written into the surface of the same disc 1. However, in the latter case, the recording area on the surface of the disc 1 is reduced and the additional reference information for generating the index pulses IP must be distinguished from the reference information 10 recorded on the same surface of the disc 1 and from the data information recorded in the tracks 2 of the same disc 1. This means that a circuit arrangement for realizing this feature becomes complicated, contrary to the simplification of the circuit arrangement.

Therefore, a circuit for controlling the position of a head for use in a disc memory unit in which even if the timing of generating the index pulse is deviated from the timing of writing the reference information, the accuracy in the detection of the position of the head is not adversely affected by this deviation, will be described hereinafter.

Figure 12:
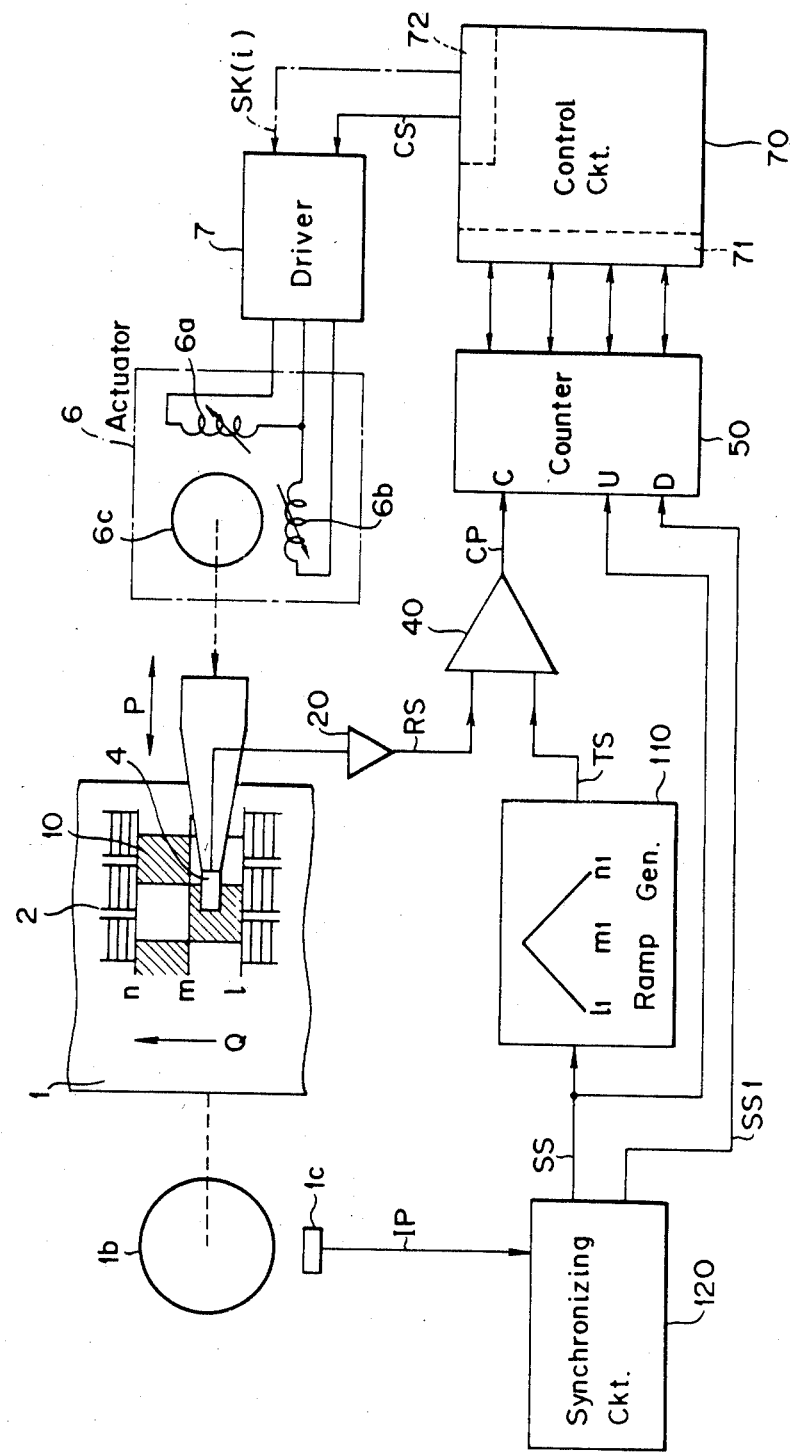
FIG. 12 is a block diagram showing another embodiment of a head-position control device in accordance with the present invention together with its associated portion for a disc memory unit.

FIG. 12 shows the fundamental arrangement of a second embodiment of the present invention. Here, the same reference numerals are used to designate portions corresponding to those in FIG. 5. The disc 1 which is rotated at a predetermined speed by the spindle motor 1b is partially shown in a developed form and the reference information 10 is written into an area which is inserted into a portion of the tracks 2 in its circumferential direction. Further, as is well known in the art, the reference information 10 may be repeatedly written into the whole surface of the disc 1 opposite to the surface thereof on which the tracks are provided.

As in the case of the reference information 10 described above with reference to FIG. 6, the adjacent reference information regions are staggered from each other in the longitudinal direction of the tracks 2 and each region has about 100 repetitive patterns which are repeatedly alternately written in the region. The reference information is written or recorded by the head 4 in synchronism with the index pulses IP, i.e., a base signal for determining the timing for reading out the reference information, generated by a sensor such as a Hall element 1c for detecting the angular position of the rotor of the spindle motor 1b.

The head 4 for reading out the reference information 10 thus recorded is shifted forward or backward in the directions indicated by an arrow P by the actuator 6. The actuator 6 can be a two-phase or multiphase stepping motor as is well known in the art and which is shown in FIG. 12 as simply comprising the rotor 6c and the two-phase stator coils 6a and 6b for the sake of simplicity. In response to a so-called seek signal SK from the driver 7 associated with the actuator 6, the actuator 6 operates as a stepping motor to drive the head 4 roughly to an approximate position on the i-th track. Furthermore, in response to a control signal CS, the actuator 6 operates as a torque motor, so that the position of the head 4 is finely adjusted to be brought to a position which is determined by the ratio between the currents flowing through the stator coils 6a and 6b, respectively.

A control circuit 70 which applies the seek signal SK or the control signal CS to the driver 7 of the actuator 6 may be formed, for instance, by a microcomputer. The head 4 reads out the reference information 10 in order to determine the magnitude and direction of the fine adjustment of the position of the head 4. The readout signal is amplified by an amplifier 20, so that the reference signal RS containing a large number of pulses as described above is obtained.

Figure 13:
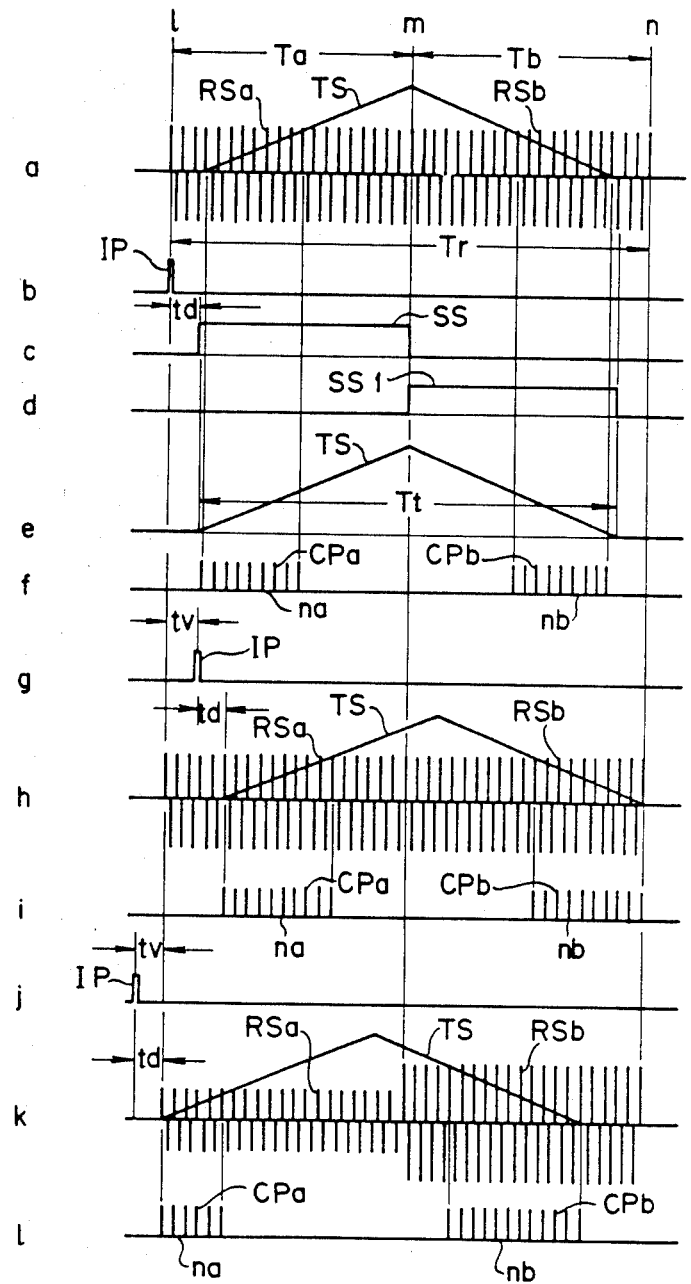
FIG. 13, consisting of a–l, illustrates waveforms of major signals used to explain the mode of operation of the embodiment as shown in FIG. 12.

FIG. 13 illustrates a waveform a of the reference signal RS when the head 4 is at the normal position P0. The reference signal RS consists of two reference signals RSa and RSb corresponding to the two sets of reference information 10A and 10B, respectively.

Referring back to FIG. 12, as shown in the block of a ramp generator 110, in response to the synchronizing signal SS delivered from a synchronizing circuit 120, the ramp generator 110 generates a triangular threshold signal TS whose peak corresponds to the midpoint m of the reference information 10.

In response to the index pulse IP, the synchronizing circuit 120 generates the synchronizing signal SS. However, the synchronizing circuit 120 does not generate the synchronizing signal SS exactly in synchronism with the index pulse IP shown by a waveform b in FIG. 13, but generates the synchronizing signal SS which rises at a time point delayed by a delay timne td from the time that the index pulse IP occurs, as shown by a waveform c in FIG. 13. Therefore, the ramp generator 110 generates the threshold signal TS at a time point delayed by a small delay time td from the time that the index pulse IP appears, as shown by a waveform e in FIG. 13. The comparator 40 compares the pulses in the reference signal RS with the threshold signal TS to generate a count pulse CP when the peak value of the pulse exceeds the threshold signal TS.

FIG. 13 illustrates a waveform f of the count pulses CP which are obtained by the above-described comparison and which are shown as consisting of two groups CPa and CPb corresponding to the reference information 10A and 10B, respectively. As is clear from FIG. 13, a time width Tt of the threshold signal TS from the ramp generator 110 is shorter than a time interval Tr between the leading edge l and the trailing edge n of the reference signal RS. More specifically, the time width Tt of the threshold signal TS is selected to be so sufficiently short that even if the threshold signal TS rises at a time point which is delayed by a delay time td from the time that the index pulse IP appears, the trailing edge of the threshold signal TS returns to its initial state at a time point not exceeding the time point corresponding to the trailing edge n of the reference signal RS.

Then, when the head 4 is at its normal position P0 as shown by the waveform a of FIG. 13 and when the index pulse IP is generated simultaneously with the leading edge l of the reference signal RS as shown by the waveform b in FIG. 13, the numbers na and nf of the respective count pulses CPa and CPb become equal to each other, as shown by a waveform f in FIG. 13.

When the index pulse IP is generated at a time point delayed by a deviation time tv from the leading edge l of the reference signal RS, as shown by a waveform a in FIG. 13, the threshold signal TS rises at a time point further delayed by the time td as indicated by a waveform h. In this case, the time width Tt of the threshold signal TS is also so selected that the trailing edge of the threshold signal TS will not be delayed behind the trailing edge n of the reference signal RS. As is apparent from FIG. 13, the above described conditions may be expressed as follows:

$$Tt \leq Tr - tv - td$$

If the above-described conditions are satisfied, the numbers na and nb of the respective count pulses CPa and CPb become equal to each other as shown by a waveform i in FIG. 13.

FIG. 13 illustrates a waveform K of the reference signals RSa and RSb and the threshold signal TS when the head 4 is deviated from its normal position P0 to the position P2 (See FIG. 6) and when the index pulse IP is generated at a time point earlier by the deviation time tv than the leading edge l of the reference signal RS. In this case, as is seen from FIG. 13, the threshold signal TS rises at a time point delayed by the time td behind the index pulse IP, but when the condition $td \geq tr$ is satisfied, the leading edge of the threshold signal TS will not appear before the leading edge l of the reference signal RS. Therefore, the pulse numbers of the count pulses CPa and CPb shown by a waveform l in FIG. 13 are not affected by the deviation time tv.

As is clear from the above description, even if the timing of generating the index pulse IP is advanced or delayed by the time td from the leading edge l of the reference signal RS, the pulse numbers na and nb of the count pulses CPa and CPb are not affected by the deviation if the threshold signal TS is delayed behind the index pulse IP by the time td which is equal to or longer than tv and the time width Tt of the threshold signal TS is so selected as to satisfy the following condition $$Tt \leq Tr - tv - td$$

Accordingly, the difference (na−nb); that is, the deviation of the head 4 from its normal position P0 can be accurately detected.

Referring back again to FIG. 12, the counter or a position-deviation detector 50 detects the difference (na-nb) between the pulse numbers na and nb of the count pulses CPa and CPb. It is sufficient that the counter 50 functions to detects the difference (na−nb) between the numbers na and nb of the count pulses CPa and CPb which are separated in time, and in a simple way, the counter 50 can be composed of an up/down counter as shown. The count pulses CP are applied to a count input terminal C of the counter 50 and the pulse counting mode is switched in response to a signal applied to either of counting mode selection terminals U and D. More particularly, the synchronizing signal SS from the synchronizing circuit 120 is applied to the count-up-mode selection input terminal U, so that simultaneously with the rise of the synchronizing signal SS, i.e., simultaneously with the occurrence of the threshold signal TS, the counter 50 is switched to the count-up mode. The signal SS1 which is complimentary to the synchronizing signal SS as indicated by the waveform d in FIG. 13 is applied to the countdown mode selection input signal D. The signal SS1 rises at the midpoint of the threshold signal TS, so that the counter 50 is switched to the countdown mode.

By switching the counting mode of the counter 50 in accordance with the count pulses CPa or CPb in the manner described above, the difference (na−nb) between the pulse numbers of the count pulses CPa and CPb is stored in the counter 50 at a time that the threshold signal TS terminates, so that it is sufficient that the stored count value at this time point is transferred through an input port 71 to the control circuit 70 in a bit-parallel manner as shown. When the difference (na−nb) becomes negative, a carry signal derived from the last stage of the counter 50 is stored and then is read out simultaneously with the read-in of the count value. In response to the position-deviation signal thus read out, the control circuit 70 computes the control signal CS to be applied to the driver 7 for the actuator 6 and supplies the control signal CS through an output port 72 thereof to the driver 7.

Figure 14:
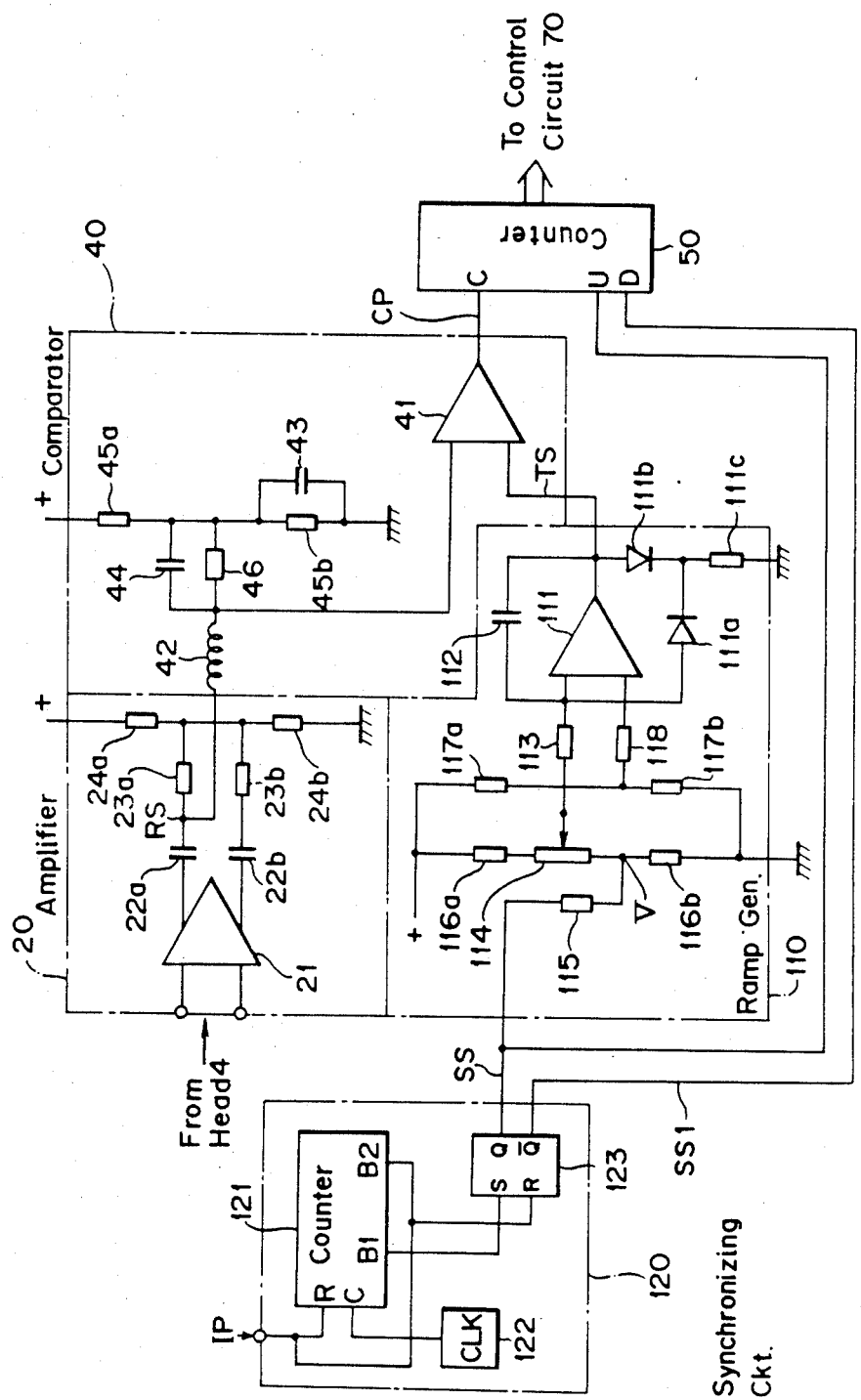
FIG. 14 is a circuit diagram showing a specific embodiment of the embodiment shown in FIG. 12

Next, referring to FIG. 14, a specific embodiment of circuits of the second embodiment will be described in more detail hereinafter. The amplifier 20 which receives the reference signal RS from the head 4 comprises a high precision operational amplifier 21 having differential inputs and differential outputs and an external circuit on the output side of the operational amplifier 21. Capacitors 22a and 22b which receive two differential outputs from the operational amplifier 21, respectively, cut off a DC cmponent in the output signals, so that only an AC component is applied to a resistor circuit in the next stage. A pair of resistors 24a and 24b are load resistors for the differential outputs, respectively. The reference signal RS is substantially derived from the junction between the resistors 24a and 24b. Here, in order to maintain the symmetry of the differential amplification of the operational amplifier 21, a pair of resistors 23a and 23b are inserted additionally between the capacitors 22a and 22b and the junction, respectively.

The threshold signal generator 110 has an operational amplifier 111 which functions as an integrator and a feedback capacitor 112 is interconnected between the input and output terminals of the operational amplifier 111, as is well known in the art. The signal to be integrated by the operational amplifier 111 is the potential at a junction V to which the synchronizing signal SS is applied through a resistor 115 from the synchronizing circuit 120. It follows, therefore, that the potential at the junction V remains in the logical state "1" from the leading edge l1 to the midpoint m1 of the synchronizing signal SS and remains in the logical state "0" from the midpoint m1 to the trailing edge n1 of the synchronizing signal SS. The integration speed; that is, the gradient of the threshold signal TS is dependent upon a time constant which is determined by the capacitance of capacitor 112 and the resistances of a resistor 113 and a variable resistor 114 connected in series to the capacitor 112.

In response to the variation in potential at the junction V, the integrator integrates the logical "1" level at the integration speed in the positive direction and then integrates at the same integration speed in the negative direction, so that the output or the threshold signal TS from the operational amplifier 111 has an isosceles triangular waveform.

An operation reference potential applied to the upper-side input terminal of the operational amplifier 111 is determined by a pair of resistors 116a and 116b, while an operation potential applied to the lower side input terminal thereof is determined by a pair of resistors 117a and 117b. These potentials are applied to the lower and upper input terminals via resistors 113 and 118, respectively. Two diodes 111a and 111b and a resistor 111c constitute a limiter which ensures the above-described operation of the operational amplifier 111.

The synchronizing circuit 120 has a counter 121 which is triggered by the index pulse IP. The counter 121 is first reset in response to the index pulse IP and then, in response to a clock pulse which is derived from a clock circuit 122 and is applied to the count input terminal C, starts its count-up operation. In response to the index pulse IP, a flip-flop 123 is first reset and then set in response to the count output derived from a count stage B1 of the counter 121 after the counter 121 counts up for a short period of time td. Therefore, the synchronizing signal SS is derived from the Q output terminal of the flip-flop 123 following this short time delay td after the index pulse IP is applied to the flip-flop 123. The flip-flop 123 remains in the set state until the count output is derived from the succeeding count stage B2 of the counter 121 and is applied to the reset terminal R of the flip-flop 123 so that the flip-flop 123 is reset. Thereafter, the flip-flop 123 remains in the reset state for the same period of time as the set state. The above-described complementary synchronizing signal SS1 is derived from the output terminal Q of the flip-flop 123.

It is to be understood that the present invention is not limited to the synchronizing circuit 120 which is simple in arrangement and that a high precision synchronizing circuit can be arranged by the combination of the conventional circuit components.

The comparator 40 has an operational amplifier 41, and a low pass filter is provided so as to remove an excessive high frequency component in the reference signal RS. The low pass filter can be an LC filter having a reactor 42 and capacitors 43 and 44. A pair of resistors 45a and 45b are inserted into the LC filter in order to determine an operation reference potential at an input terminal of the operational amplifier 41 which receives the reference signal RS. More particularly, a DC reference potential is applied through a resistor 46 to the input terminal. The operational amplifier 41 compares the reference signal RS applied to the upper side input terminal thereof with the threshold signal TS applied to the lower side input terminal thereof to supply the count pluses CP to the above-described up/down counter (position-deviation detector) 50.

In addition to the above-described embodiments, the circuit for controlling the position of a head for use in a disc memory unit in accordance with the present invention may be realized in various ways. Especially, the synchronizing circuit 120, the comparator 40 and the counter 50 may be freely modified by various combinations of the conventional circuit components so as to attain their functions within the scope of the present invention.

The ramp generator 110 is also not limited to the above-described arrangement. Its output is not limited to the waveforms described above and may be a repetitive sawtooth waveform. However, the triangular waveform having a peak value in the middle described above has the following special effects. Referring back to FIG. 13 showing the waveform h or k, the threshold signal TS is delayed by a time difference (td±tv) with respect to the leading edge l of the reference signal RS, so that the position of its peak is more or less deviated relative to the midpoint m of the reference signal RS.

It follows, therefore, that when the center peak value of the threshold signal TS is lower than the maximum peak value of the reference signal RS, there arises the possibility that the number of count pulses CP counted has an error, but when the center peak value of the threshold signal TS is set at a level slightly higher than the maximum peak value of the reference signal RS, no error occurs when the count pulses CP are counted under any conditions. That is, a triangular waveform having its maximum peak at the midpoint between the time point at which the triangular waveform rises and the time point at which the triangular waveform falls to its initial state, may be advantageously used to eliminate any error in counting the count pulse CP.

It is preferable to select the peak value of such a triangular waveform higher than the maximum peak value of the reference signal RS and more precisely it is preferable that the peak value of the triangular waveform is equal to or slightly higher than $(1+2td/Tt)$ times the maximum peak value of the reference signal RS, when the maximum deviation time width of the timing that the index pulse IP occurs is $t_{vm}$ and the delay time td of the threshold signal TS is the same as $t_{vm}$.

As described above, according to the present invention, regardless of the deviation of the rise timing of the base signal for determining a timing for reading out the reference information (i.e., the index pulse in the above-described embodiment) from the timing of the initial writing of the reference information, the position of the head can be always detected with a high degree of accuracy, so that a deviation from the normal position of the head can be corrected.

Furthermore, according to the present invention, the circuit arrangement for detecting the position of the head is simple yet highly reliable in operation.

As compared with the first embodiment described above with reference to FIGS. 5-10, in the second embodiment described above with reference to FIGS. 12-14, it is sufficient to slightly delay the synchronizing signal derived from the synchronizing circuit, and thus no additional circuit is needed. In addition, the practical problems to be encountered when the first embodiment is carried out can be completely overcome.

When the present invention is carried out, it is necessary that the time width of the reference signal be wider than the time width of the threshold signal. Accordingly, from a theoretical standpoint, the region into which reference information is written must be increased, but a range of variation in timing of the occurrence of the base signal (index pulse) is generally very small and is less than 1/20 of the whole time width of the reference signal, so that it is not necessary in practice to increase the reference information region when the present invention is carried out.

What is claimed is:

1. A system for controlling the position of a head in a disc memory unit, comprising:
   a rotatable disc having a surface with a plurality of concentric tracks thereon, each of said tracks including a center line, said rotatable disc having recorded on said surface on each side of the center line of each of said tracks first and second patterns bearing first reference information and second reference information respectively, said first reference information being displaced in the circumferential direction of said tracks with respect to said second reference information;
   a spindle motor for rotatably driving said disc;
   index pulse generating means coupled to said spindle motor, said index pulse generating means generating an index pulse when said disc is at a predetermined angular position, said first reference information and said second reference information being recorded on the surface of said disc in synchronism with said index pulse;
   an adjustable head for writing information in and reading information out of the surface of said disc, said head generating a reference signal including said first and second reference information;
   synchronizing means responsive to said index pulse for generating a synchronizing signal;
   threshold signal generating means for generating a threshold signal having a first portion which increases in magnitude substantially linearly after a first point in time to a peak value and having a second portion which decreases in magnitude substantially linearly to about its initial value at a second point in time, the start of the first portion of said threshold signal occurring at said first point in time in response to said synchronzing signal just after said reference signal generates the beginning of said first reference information and the end of the second portion of said threshold signal occurring at said second point in time in response to said synchronizing signal just prior to said reference signal generating the termination of said second reference information;
   comparator means for comparing the magnitude of said reference signal with the magnitude of said threshold signal, the output of said comparator means comprising a first pulse train having a number of pulses therein corresponding to the number of times the magnitude of the first reference information in said reference signal exceeds the magnitude of the first portion of said threshold signal and a second pulse train having a number of pulses therein corresponding to the number of times the magnitude of the second reference information in said reference signal exceeds the magnitude of the second portion of said threshold signal;
   counter means coupled to said synchronizing means and to said comparator means, said counter means counting the difference in the number of pulses in said first and second pulse trains; and
   head position correcting means for correcting the position of said head in accordance with said difference obtained from said counter means.

2. A system for controlling the position of a head in a disc memory unit as claimed in claim 1, wherein said counter means is an up/down counter in which one of up and down counting modes is determined according to said synchronizing signal.

3. A system for controlling the position of a head in a disc memory unit as claimed in claim 1, wherein each of said first and second patterns comprises a plurality of region pairs extending in said circumferential direction, and wherein each region pair includes a first region into which a group of repetitive patterns is recorded and a second region which is the same in size as said first region and which has no repetitive pattern.

4. A system for controlling the position of a head in a disc memory unit as claimed in claim 2, wherein each of said first and second patterns comprises a plurality of region pairs extending in said circumferential direction, and wherein each region pair includes a first region into which a group of repetitive patterns is recorded and a second region which is the same in size as said first region and which has no repetitive pattern.

* * * * *